Dec. 10, 1935.  R. P. ALFRED  2,023,393
REAR LIGHT FOR AUTOMOBILES AND OTHER VEHICLES
Filed Dec. 1, 1934
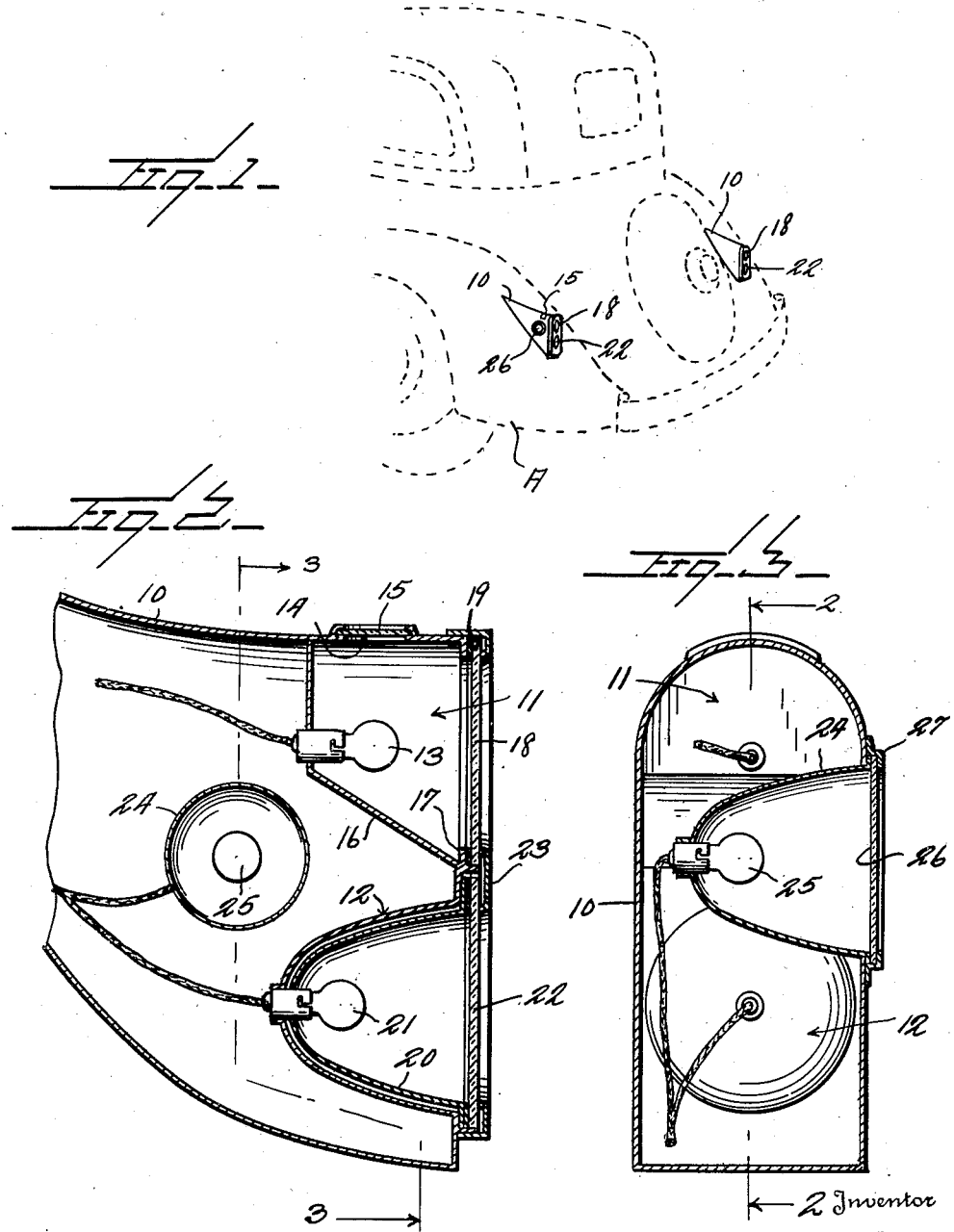

Patented Dec. 10, 1935

2,023,393

UNITED STATES PATENT OFFICE 2,023,393

REAR LIGHT FOR AUTOMOBILES AND OTHER VEHICLES

Ruth P. Alfred, Ottumwa, Iowa

Application December 1, 1934, Serial No. 755,607

1 Claim. (Cl. 245—8.3)

This invention relates to automobiles and particularly to the rear lights thereof, the object of this invention being to provide lights on the rear end of automobiles, buses, and trucks, which will illuminate the road at the rear of the machine and also at the side of the machine for the purpose of permitting the driver of the car to guide the vehicle when backing. In very many situations it is almost imperatively necessary that some light be thrown rearward of the car in order that the driver may see to properly back. This is particularly necessary in narrow alleys, in backing into garages, in backing among parked machines, and in a large number of other situations.

A further object is to provide lamps of this character which preferably are formed as part of the machine itself, as for instance, being formed upon the rear ends of the rear fenders, and which are so constructed as to combine the usual tail-light and illuminating lights capable of illuminating the ground immediately rearward of the vehicle and at the side of the rear of the vehicle.

My invention is illustrated in the accompanying drawing, in which

Figure 1 is a fragmentary perspective view in dotted lines of the rear end of an automobile, showing my lamps, in full lines, applied thereto.

Fig. 2 is a vertical section through one of the rear lamp housings.

Fig. 3 is a section on the line 3—3 of Fig. 2.

Referring particularly to Figs. 2 and 3, 10 designates a rear lamp housing, which as illustrated is a housing adapted to be applied, as by welding or otherwise, to the rear end of a fender A. The rear end of the housing 10 is formed to provide an upper compartment 11 and a lower compartment 12. Within the upper compartment is the usual tail-light 13. This upper compartment has an opening 14 in its upper wall protected by a glass pane 15. The light from the lamp 13 is thrown upward through this sheet of glass 15 onto the license plate, these license plates being now carried on the rear fenders. The bottom of the compartment 11 slopes downward as at 16, and the rear end of this compartment 11 is formed with flanges 17 and is closed by a glass pane 18 resting against the usual gasket 19. This glass pane 18 is preferably red in color.

Within the compartment 12 is disposed a parabolic reflector 20, and disposed within this reflector is the lamp 21 having the usual base extending out thru the inner end of the reflector and through the inner end of the wall of the compartment. The forward end of this compartment 12 is closed by the pane of clear glass 22. The panes 18 and 22 are held in place by a face plate 23, of any suitable character. The side wall of the housing 10 rearward of the compartments 11 and 12, has a lateral opening and behind this lateral opening and housed within the housing 10 is the reflector 24, shown as a parabolic reflector, the inner end of which carries the lamp 25. A pane of clear glass 26 extends across the forward end of the reflector 24 and is held in place by any suitable means, as by the rim 27.

Suitable connections are, of course, made from the several lamps 13, 21 and 24 to a switch or switches whereby these lamps may be controlled. Of course, the lamp 13 will be controlled entirely independently of either of the lamps 21 and 25, but the lamps 21 and 25 on both sides of the machine may be controlled by a single switch which when thrown on will energize these lamps and which, when thrown to an off position, will deenergize them.

Preferably, as before stated, the housing 10 will be formed as part of the fender A, thus adding to the ornamental characteristics of the car.

The side lights are particularly valuable in that in backing in crowded places or narrow situations, the side lights illuminate the cars or obstacles at the side of the vehicle while the rear lights illuminate obstacles at the rear of the vehicle. Thus the driver can see clearly just what impediments are present to backing and can steer properly. If only the rear lights are used then there is no clear illumination of impediments which may be on either side of the car or very close thereto. The lamp housings are designed so that light will be cast downward and laterally at a sufficient angle to properly illuminate the ground.

While I have illustrated the lamp housings as being formed separately and as being attachable to the fenders, it is to be understood that the fenders might be made initially with these lamp housings integral therewith by dieing the fenders out to provide the lamp housings.

While I have illustrated certain details of construction and arrangement of parts, I do not wish to be limited thereto, as obviously many changes may be made without departing from the spirit of the invention as defined in the appended claim.

I claim:

A motor vehicle light structure, comprising a relatively narrow casing having parallel side walls and a connecting top edge wall and having an open end, said top edge wall having a window opening transversely thereof, a partition extending downwardly from said top edge wall and forwardly to the transverse center of said open end, said partition connecting the casing side walls, a reflector disposed in the casing beneath said partition and directed rearwardly through said open end, a frame having a pair of windows and disposed over and closing the open end of said casing, an illuminating element within the area between the top wall and the forwardly extending lower part of the partition, an illuminating element within said reflector, said casing having a window opening in a side wall, a light reflector within the casing and covering said last window opening, and an illuminating element in said last reflector which is electrically connected with the illuminating element in the first reflector whereby the elements of the two reflectors will be simultaneously lighted.

RUTH P. ALFRED.